April 18, 1933.  B. W. ST. CLAIR  1,904,096
ELECTRICAL INSTRUMENT
Filed Jan. 19, 1932
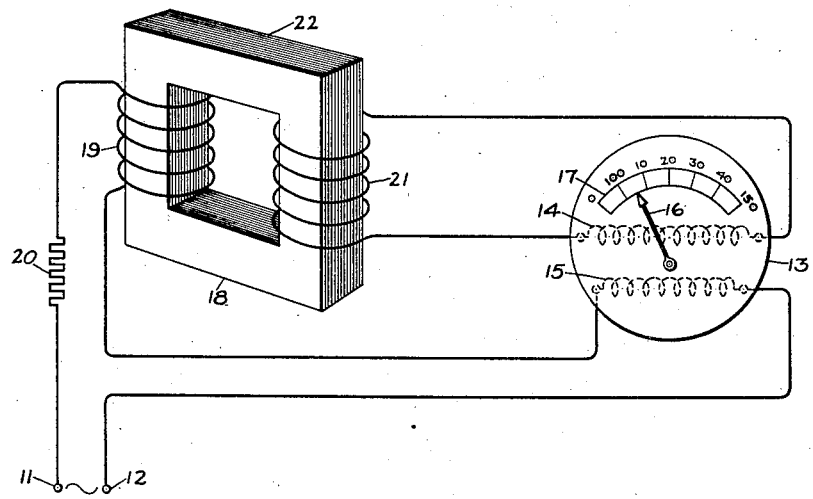
Inventor:
Byron W. St.Clair,
by Charles E. Mullen
His Attorney.

Patented Apr. 18, 1933

1,904,096

UNITED STATES PATENT OFFICE

BYRON W. ST. CLAIR, OF LYNN, MASSACHUSETTS, ASSIGNOR TO GENERAL ELECTRIC COMPANY, A CORPORATION OF NEW YORK

ELECTRICAL INSTRUMENT

Application filed January 19, 1932. Serial No. 587,597.

My invention relates to electrical instruments and concerns particularly instruments in which the zero and the lower portion of the scale are suppressed.

The principal object of my invention is to provide a simple reliable arrangement in which the zero suppression is effected electrically, thereby eliminating strains or violent stresses which might injure the instrument or alter the calibration when the measured value remains at or falls suddenly to a low value. Other objects will become apparent as the description proceeds.

In the usual form of zero suppression restraining springs are utilized. However, the stresses set upon the springs tend to cause serious errors in the course of time. This difficulty is overcome, in accordance with my invention, by supplying the restraining force electrically.

A differential type of instrument or one in which one of the windings may be divided into two opposing portions is arranged so that the opposing windings are traversed by substantially balanced currents until the measured quantity attains a value corresponding to a point at the lower end of the scale range. When the measured quantity exceeds this value the current traversing one of the windings increases less rapidly or becomes substantially constant as the current in the other winding continues to increase in response to an increase in the magnitude of the measured quantity. This result may be accomplished by connecting one of the instrument windings to the alternating-current circuit to be measured in series with the primary winding of a transformer, and connecting the other winding of the instrument to the secondary of the transformer, which is so designed that its magnetic core saturates for a value of the measured quantity at the lower end of the instrument range. The features of my invention which I believe to be novel and patentable are pointed out in the claims appended hereto.

In the accompanying drawing which illustrates my invention there is shown an arrangement for measuring voltage across the points 11 and 12 of an alternating-current circuit but it will be understood that apparatus arranged in accordance with my invention may be applied to the measurement of other quantities as well. A suitable electrical instrument or current responsive device 13 is provided having differential or opposed windings 14 and 15, and a pointer 16 cooperating with a scale 17. A transformer 18 has a primary winding 19 connected in series with instrument winding 15 and resistance or multiplier 20 across points 11 and 12 of an alternating-current circuit between which voltage is to be measured. The secondary winding 21 of transformer 18 is connected to winding 14 of instrument 13.

For voltages above a predetermined value the core 22 of transformer 18 becomes magnetically saturated and the current in instrument winding 14 remains substantially constant, although the current in winding 15 continues to increase with increase in voltage. Preferably windings 14 and 15 are balanced windings, and transformer 18 has substantially an equal number of turns to give a 1:1 ratio; but obviously I am not limited to this exact arrangement. If, for example, the device is designed to have an expanded scale over the range of 100 to 150 volts, the transformer 18 would be designed to saturate at approximately 100 volts so that the deflection of pointer 16 would be negligible for voltages under 100. Although I have shown an indicating voltmeter by way of illustration it will be understood that my invention is not limited thereto but obviously includes all current responsive or measuring devices having current or potential windings which may be divided or arranged to act differentially such as contact making and recording instruments, ammeters, wattmeters, relays, ratiometers, and the like.

While I have shown my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States, is:

1. In combination with an alternating-current circuit, a transformer having primary and secondary windings and an electrical measuring device having a winding divided into two opposing portions, said transformer primary and one portion of the winding of said measuring device in series being connected to said alternating-current circuit, said transformer secondary being connected to the other portion of the winding of said measuring device.

2. In combination with an alternating-current circuit, a transformer having primary and secondary windings, and a voltmeter having a pair of opposing field windings, said transformer primary and one of said field windings in series being connected to said alternating-current circuit, said transformer secondary being connected to the other of said voltmeter field windings.

3. A suppressed zero measuring device comprising in combination with an alternating-current system, an electrical instrument having a winding divided into two opposing portions, a transformer having a core of magnetic material, and primary and secondary windings, said transformer primary and one portion of said instrument winding in series being connected to said alternating-current system, said transformer secondary being connected to the other portion of said instrument winding, the relationship between the electrical and magnetic circuits of the transformer being such that for measured values below a point in the lower portion of the range of the device the transformer core is relatively unsaturated and for measured values within the range of the device, the transformer core becomes saturated.

4. A suppressed zero voltmeter comprising in combination with an alternating-current system, an electrical instrument having a pair of opposing field windings, a transformer having a core of magnetic material, and primary and secondary windings, said transformer primary and one of said field windings in series being connected across said alternating-current system, said transformer secondary being connected to the other of said field windings, the relationship between the electrical and magnetic circuits of the transformer being such that for measured values below a point in the lower portion of the range of the voltmeter the transformer core is relatively unsaturated and for measured values within the range of the voltmeter, the transformer core becomes saturated.

5. In combination with an alternating-current circuit, an electrical instrument having a winding divided into two substantially balanced opposing portions, a transformer having a core of magnetic material, and primary and secondary windings having approximately the same number of turns, said transformer primary and one portion of said instrument winding in series being connected to said alternating-current circuit, said transformer secondary being connected to the other portion of said instrument winding.

6. In combination with an alternating-current system, a suppressed zero voltmeter comprising an electrical instrument having a winding divided into two substantially balanced opposing portions, a transformer having a core of magnetic material, and primary and secondary windings having substantially the same number of turns, said transformer primary and one portion of said instrument winding in series being connected to said alternating-current system, said transformer winding being connected to the other portion of said instrument winding, the relationship between the electrical and magnetic circuits of the transformer being such that for measured values below a point in the lower portion of the scale range of the voltmeter the transformer core is relatively unsaturated and for measured values within the range of the voltmeter, the transformer core becomes saturated.

In witness whereof, I have hereunto set my hand.

BYRON W. ST. CLAIR.